US005923405A

United States Patent [19]

Kayama

[11] Patent Number: 5,923,405

[45] Date of Patent: Jul. 13, 1999

[54] METHOD AND SYSTEM FOR SPECIFYING POSITION OF FRAME TO BE PRINTED IN FILM PIECE

[75] Inventor: Yasutaka Kayama, Wakayama, Japan

[73] Assignee: Noritsu Koki Co., Ltd., Wakayama-ken, Japan

[21] Appl. No.: 08/889,710

[22] Filed: Jul. 8, 1997

[30] Foreign Application Priority Data

| | | | |
|---|---|---|---|
| Jul. 9, 1996 | [JP] | Japan | 8-178976 |
| Jul. 9, 1996 | [JP] | Japan | 8-178977 |

[51] Int. Cl.$^{6}$ .......... G03B 29/00; G03B 27/52

[52] U.S. Cl. .......... 355/29; 355/28; 355/40

[58] Field of Search .......... 355/28, 29, 40, 355/41, 42, 75

[56] References Cited

U.S. PATENT DOCUMENTS

| | | | |
|---|---|---|---|
| 4,825,387 | 4/1989 | Ono | 355/40 |

FOREIGN PATENT DOCUMENTS

| | | |
|---|---|---|
| 5782332 | 11/1955 | Japan . |
| 52-135721 | 11/1977 | Japan . |
| 56-42227 | 4/1981 | Japan . |
| 59-34291 | 8/1984 | Japan . |

OTHER PUBLICATIONS

Derwent Abstract of Japan Patent No. 59–000029, Jun. 23, 1982.

Derwent Abstract of Japan Patent No. 59–034291, Aug. 19, 1982.

Patent Abstract of Japan Patent Application No. 59–028163, Jan. 5, 1985.

Patent Abstract of Japan Patent Application No. 51–073683, Dec. 27, 1977.

Patent Abstract of Japan Patent Application No. 51–027938, Sep. 16, 1977.

Patent Abstract of Japan Patent Application No. 60–138469, Dec. 26, 1986.

Patent Abstract of Japan Patent Application No. 06–264143, May 17, 1996.

*Primary Examiner*—Safet Metjahic
*Assistant Examiner*—Peter Kim
*Attorney, Agent, or Firm*—Fulbright & Jaworski, LLP.

[57] ABSTRACT

A film holder holds a plurality of film pieces which are obtained by cutting a film having a plurality of frames between the forward and rear longitudinal ends. The film pieces are cut from the film in such a manner that the first and the last two pieces will contain fewer frames than a predetermined total number of frames while the others will contain the predetermined total number of frames. The invention provides a method and a system capable of specifying a position of a designated frame in these film pieces as held in the holder based on a serial frame number of a first reference frame selected from the frames contained in the second to last film piece and a serial frame number of a second frame selected so as to allow determination of the total number of the frames contained in the second to last film piece.

12 Claims, 4 Drawing Sheets

METHOD AND SYSTEM FOR SPECIFYING POSITION OF FRAME TO BE PRINTED IN FILM PIECE

BACKGROUND OF THE INVENTION

1. Field of the Invention

The present invention relates to the art of specifying a position of a frame to be printed in a plurality of film pieces stored in a film piece holder means according to a predetermined cutting order. The film pieces are obtained by cutting a film into the number of pieces in such a manner that the first piece and the last two pieces each has fewer frames than a predetermined number of frames while the other pieces each has the predetermined number of frames.

2. Description of the Related Art

At a camera shop, when a shop attendant receives a customer's order for reprint, he/she keeps a foldable film piece holder storing a plurality of film pieces and writes in an order slip the serial number of frame(s) to be reprinted and also the number of reprints to be produced therefrom. Thereafter, an operator of a photographic printer checks the order slip and selects and takes out , from the film piece holder, a film piece(s) which contains the specified frame(s) and then sets the piece to the printer for obtaining copy(s) or reprint(s) of the image of the frame.

The convention has proposed some measures for automating the above manual reprint order procedures. For instance, according to Japanese published patent gazette Sho. 59-92, in an unfolded state of the foldable film piece holder holding a plurality of film pieces according to a predetermined order, a serial frame number of a frame located at the right end of the first uppermost film piece is recorded, so that the film pieces to which the other frames belong and their positions in these respective pieces may be specified with reference to the recorded serial frame number of the right-end frame in the first piece. This art is based on the assumption that the other film pieces than the first one all contain a same predetermined number of frames. As a matter of fact, when the film pieces are obtained by cutting of a film, the lengths of the last two pieces are adjusted so as to allow the last piece to contain at least two frames. This is because a film piece containing only one frame will be too short to be processed properly by the printer. As a result, it sometimes happens that the last two film pieces have fewer frames than the predetermined number. In such case, the above-described method cannot achieve its object of specifying the position of frame(s).

Japanese published patent gazette Sho. 59-34291 attended to the above problem and proposed a different method. In this method, in addition to the serial frame number of the right-end frame in the uppermost film piece, the respective total numbers of the frames contained in the last two film pieces are also recorded. With this, even when the last two film pieces have fewer frames than the predetermined number of frames, the other film pieces containing the other frames and the positions of these frames within the respective pieces may be specified.

The latter-described art has indeed solved the problem of the former-described art. However, this improved art still requires the recording of three numeric data belonging to difference data categories, i.e. the serial frame number of the right-end frame in the first (uppermost) film piece, the total number of frames of the last film piece and the total number of frames of the second to last film piece. Especially, the recording of the plurality of numeric data belonging in different categories such as the serial frame number and total number of frames tends to invite an data input error.

SUMMARY OF THE INVENTION

In view of the above-described state of the art, in the art of specifying a position of a frame to be printed in a plurality of film pieces as stored in a film piece holder means according to a predetermined cutting order, the film pieces being obtained by cutting a film into the number of pieces in such a manner that the first piece and the last two pieces each has fewer frames than a predetermined number of frames while the other pieces each has the predetermined number of frames, a primary object of the present invention is to provide a method and system which require only input of minimal number of numeric data belonging in a same data category.

For accomplishing the above-noted object, in a method according to the present invention, the film piece containing a designated, i.e. target frame is specified based on a serial frame number of a first reference frame selected from a second to last film piece and a serial frame number of a second reference frame selected so as to allow determination of the total number of frames contained in the second to last film piece in correlation with the serial number of the first reference frame. That is, as all the film pieces other than the first and the last two film pieces have the predetermined number of frames, frames present between the first reference frame and the second reference frame may be divided into those contained in film pieces having the predetermined total number of frames and others contained in the second to last film piece. And, based on the value of the latter, the total number of frames contained in the second to last film frame may be determined. This means that any film piece containing a frame corresponding to the designated frame number can be specified based on the serial frame numbers of the first and second reference frames.

Further, if necessary, the order or position of the designated frame within the particular film piece too may be readily determined by a simple calculation.

For instance, let us now suppose that one film is cut into film pieces so that the last film piece contains three frames and the last to second film piece contains four frames while the other pieces all contain six frames as the predetermined number of frames. Then, the first reference frame will be the one frame located at the right end of the second to last film piece and having a serial frame number of 18, and the second reference frame will be the one frame located at the right end of the third from first film piece and having a serial frame number of 14. In this case, the difference: $4=18-14$ is the total number of the frames contained in the second to last film frame. Then, with the availability of this value, i.e. information concerning the cutting condition of the second to last film frame, any film piece containing a target frame and also the position of the target frame within this particular film piece may be specified based upon the serial frame number.

For instance, if the designated serial frame number: N is any one between 15 (the serial frame number of frame immediately next to the second reference frame: i.e. the serial frame number of the left end frame in the last to second film piece) and 18, the target frame is determined to be contained in the second to last film piece and also this frame is determined to be located on the $(N-14)$th position from the left end of the film piece. In this, the serial frame number 14 is that of the frame located at the right end of the third to last film piece, that is, this is the serial frame number of the second reference frame described hereinbefore.

Further, if the designated serial frame number: N is greater than the serial frame number of the first reference frame, i.e. 18, this target frame is determined to be contained in the last film piece and its position within the last film piece too may be obtained by an equation: N−18. In this, 18 is the serial frame number of the frame located at the right end of the second to last film piece, that is, this is the serial frame number of the first reference frame.

On the other hand, if the designated frame number: N is smaller than 14, this target frame is determined to be contained in the QUOT [14−N, 6]+3 th film piece from the last. In this, QUOT [Numeral 1, Numeral 2] represents an integer portion of a quotient obtained by dividing Numeral 1 by Numeral 2. Further, the position of this frame from the left end of the piece too may be obtained by an expression: 6−MOD [14−N, 6]. In this, MOD [Value 1, Value 2] represents the reminder of the above division of Numeral 1by Numeral 2. Incidentally, the first film piece contains fewer frames than the predetermined number of frames, so that a frame in this piece cannot be specified by its order from the left end. Hence, in this case, the reverse order from the right end obtained by an expression: MOD [14−N, 6]+1 will be employed for the same purpose. Whether a target frame having the designated serial frame number is contained in the first film piece or not may be readily determined by determining first the order to the last of the film piece containing a frame having a serial frame number: N of 0. In the above expression, the value '14' represents the serial frame number of the frame located at the right end of the third to last film piece, i.e. the serial frame number of the second reference frame.

The specific positions of the first reference frame and the second reference frame may vary in any other manner than those described in the foregoing description. Preferably, however, those frames located at the opposed ends of the second to last film piece should be designated as the first reference frame and the second reference frame, respectively. For, in this case, the checking of the serial numbers of the first and second reference frames requires checking of the second to last film piece alone. Hence, the checking operation, which is necessary at the time of receiving a reprinting order from a customer, of the first and second reference frames in film pieces provided by the customer may be facilitated.

The above-described frame specifying method according to the present invention requires data input of the serial frame numbers of the first and second reference frames. As a specific method for this data input, it is possible to utilize such reader means as a scanner included in the photographic printer for its original purpose of monitoring a frame image. And, if the positions of the first and second reference frames are set in advance in the system, then, by receiving the serial frame number of the target frame to be printed, the system may automatically select the film piece to be printed and feed this piece to the exposing/printing section.

As an alternative input method, the serial frame numbers of the first and second reference frames may be recorded in a medium storing reprint order information therein. In this case, by first reading the reprint order information, the system may obtain the data concerning the film piece containing the target frame to be reprinted and the total number of reprints to be obtained therefrom.

According to one preferred embodiment of the present invention, a recording medium storing therein position data of a frame to be reprinted according to a customer's order and the serial frame numbers of the first and second reference frames is adapted to be held, together with the film pieces, in a film piece holder means which can be realized in the form of the film piece holder. With this, it is possible to avoid inconvenience of the recording medium and the film pieces being accidentally separated from each other. Moreover, the series of operations for reading the reprint order information from the recording medium and taking out a necessary film piece from the holder may be effected by a same handling device. According to a preferred embodiment proposed for achieving this purpose, the recording medium is provided in the form of a recording sheet having dimensions similar to those of the film piece. The specific method of recording the data in the recording sheet may be any of various known recording methods such as a mark-sheet type or magnetic recording type.

In any case, the reader device is needed for reading the reprint order information from the recording medium such as the recording sheet. But, the optical or magnetic type reading device generally incorporated within the photographic printing device may be advantageously utilized as this reader means. In this respect, according to a further preferred embodiment of the present invention, the reader means reads the reprint order information when the recording sheet after being drawn out of the film piece holder means such as the film piece holder is returned into this holder means. In general, a holding pocket of such film piece holder means is provided with some excess width-wise space for allowing smooth insertion and withdrawal of the film piece, but this excess space makes it difficult to accurately control the position of the recording medium during the step of drawing it out of the pocket, which control is essential for reliable data reading operation. Therefore, before the data reading operation can be started, the recording medium must first be withdrawn completely from the holder and then positioned accurately at a predetermined position for data reading operation. On the other hand, according to the above-described method of the invention, the data reading operation may be effected simultaneously with the step of returning the recording sheet back into the film piece holder means during which step the recording sheet has already been restricted in its position. As a result, the efficiency of the entire process may be improved.

Further and other objects, features and effects of the present invention will become more apparent from the following more detailed description of the embodiments with reference to the accompanying drawings.

DESCRIPTION OF THE PREFERRED EMBODIMENTS

Figure 1:
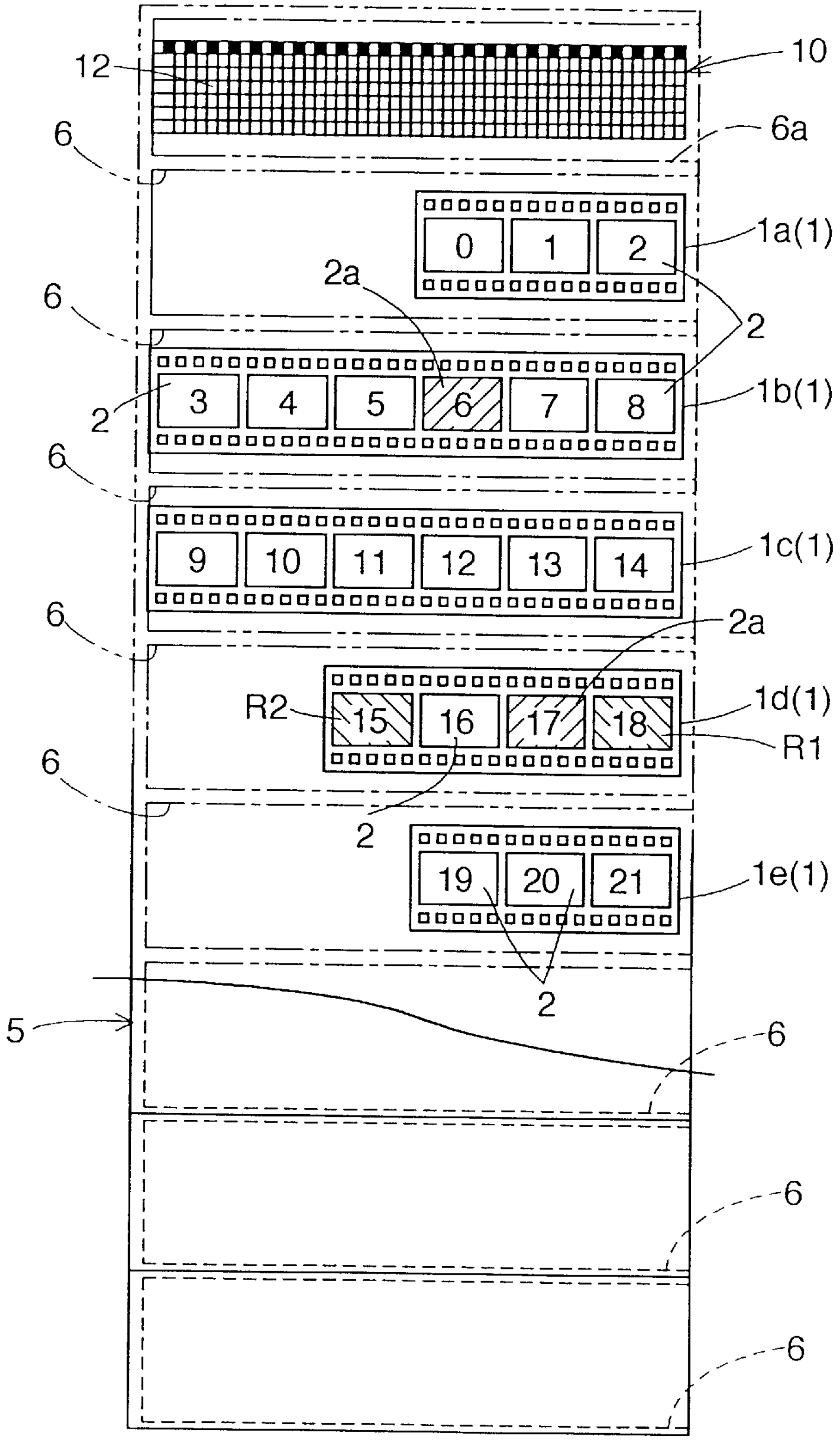
FIG. 1 is a descriptive view showing a recording sheet and film pieces held in respective holder pockets of a film piece holder.

At a camera shop, when a shop attendant receives a reprint order from a customer, he/she keeps from the customer a film piece holder 5 storing therein a plurality of film pieces 1, as shown in FIG. 1, when the attendant also keeps a recording sheet 10 shown in FIG. 2 recording therein a serial frame number of a frame(s) to be reprinted and the number of reprints to be made therefrom as well as serial frame numbers of first and second reference frames to be described later. Alternatively, the attendant will have the customer write these data into an order slip. The film piece holder 5 is the well-known type including a plurality (total eight, in the illustrated example) of elongate film pockets 6 each holding therein a film piece. The film pockets 6 are arranged one above another on the unfolded surface of the holder. That is, this holder 5 may be folded along border lines delimiting adjacent pockets. This holder 5 further includes an additional pocket 6*a* for holding the recording sheet 10. For this purpose, it is preferred that the recording sheet 10 be sized similarly to the film piece 1. Each pocket 6 has a length capable of storing one film piece 1 containing total six frames. These film pieces 1 are obtained by cutting a single film into the number of pieces to a length of 6 frames in general (sometimes a 4-frame length is employed and in such case too the method of the invention may be implemented. The following discussion, however, is based on the assumption of 6-frame length). In this cutting, if the last cut piece has only one frame, such short piece may cause a problem in the printing process. Therefore, in order to allow the last film piece to contain at least two frames 2, the length of this last piece is adjusted by e.g. causing the second to last film piece to contain fewer than 6 frames in total. On the other hand, in the sample illustrated in FIG. 1, the first film piece 1*a* has the full length corresponding to 6 frames but fewer frames, since the first frame 2 is formed with a predetermined distance from the starting end of the film, due to the mechanical requirement or limitation of the camera employed. As a result, this first film piece contains only three frames in total. The second and third film pieces 1*b*, 1*c* respectively contains the full number of frames, i.e. total six frames. The second to last film piece 1*d* has a shorter length and contains only four frames for the abovedescribed purpose of the length adjustment of the last film piece 1*e;* and accordingly this last film piece 1*e* contains total three frames 2.

Actually, serial frame numbers from '0' to '21' corresponding to the respective frames 2 are recorded in the vicinity of a perforation of each film piece 1. For the clarity of illustration, however, these numbers are shown at the center of the respective frames.

Figure 2:
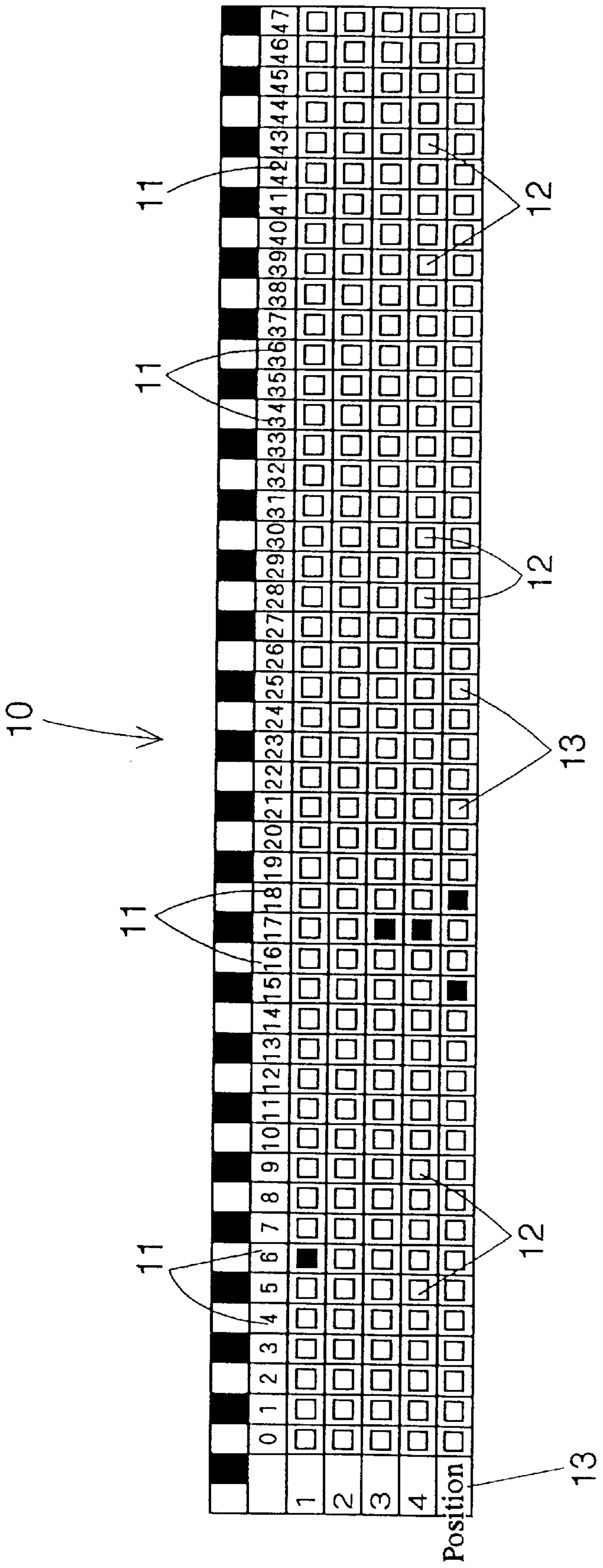
FIG. 2 is a plan view of the recording sheet.

As shown in FIG. 2, the recording sheet 10 includes a frame number area 11, a print number area 12 in which the total number of reprints obtained for a desired frame(s) 2 is entered in the mark sheet method, and a reference frame number area 13 in which the serial frame numbers of the first and second reference frames are entered in the mark sheet method. In this particular embodiment, the frame located at the right end of the second to last film piece is designated as the first reference frame R1 and the frame located at the left end of the same film piece is designated as the second reference frame R2. Then, in the FIG. 1 construction of the film pieces 1, the first reference frame R1 is provided with the serial frame number '18' (this number will be represented also by 'X' in the following discussion) and the second reference frame R2 is provided with the serial frame number '15' (this number will be represented also by 'Y' in the following discussion), as shown in FIG. 2. Further, in the marking illustrated in FIG. 2, it may be seen that the customer ordered one reprint of the frame 2*a* having the serial frame number '6' and seven reprints of another frame 2*a* having the serial frame number '17'.

Based on the data recorded in the recording sheet 10 in the above-described manner, the positions of the target frames 2*a* to be printed in the plurality of film pieces as being held within the film holder 5 may be specified as described next.

First, a frame 2 having a designated serial frame number: N which is greater than 15(−Y) and smaller than 18(=X) is determined to be contained in the last to second film piece 1*d* and the position of this frame within the piece 1*d* is determined also to be located at the (N−15+1)th position from the left end of the film piece 1*d,* i.e. at the (N−Y+1)th position if represented by a general expression. A further frame 2 having a designated serial frame number: N which is greater than 19(=X+1) is determined to be contained in the last film piece 1*e* and the position this frame within the piece 1*e* is determined also to be located at the (N−18)th position from the left end of the piece, i.e. at the (N−X)th position. A still further frame having a designated serial frame number: N which is smaller than 14 (=Y−1) is determined to be contained in any one of the film pieces other than the second to last and last film pieces 1*d,* 1*e*. Then, if the designated serial frame number is 'N', then, a value obtained by an expression:

QUOT [14−N, 6]+3 or by a general expression:

QUOT [Y−1−N, 6]+3 represents the position of this frame as counted from the left end frame of the film piece 1 having the serial frame number N. For instance, if N=6, this frame is determined to be contained in the fourth to the last film piece. In the above, QUOT [Numeral 1, Numeral 2] represents an integer portion of the quotient obtained by dividing Numeral 1 by Numeral 2. Further, the position or order of this frame within the film piece may be determined by a following expression:

6−MOD [14−N,6] or by a general expression:

6−MOD [Y−1−N,6].

In the above, MOD [Numeral 1, Numeral 2] represents the remainder obtained from the division of Numeral 1 by Numeral 2. Incidentally, in the case of the first film piece, as this piece has fewer frames than the predetermined number, a frame cannot be specified by its order from the left end frame in this piece. Therefore, in this case, it is possible to employ instead a reverse ordered position counted from the right end frame of the piece obtained by a following expression:

MOD [14−N,6]+1, or by a general expression:

MOD [Y−1−N,6]+1.

Whether a frame having a designated serial frame number is contained in the first film piece or not may be readily determined by determining in advance the order of a film piece having a frame with the designated serial frame number: N of '0' from the last film piece (in this particular case, the film piece is the fifth from the last. That is, there exist five film pieces in total in the film holder).

From the above, it may be determined that the target frame 2*a* having the serial frame number '6' is contained in the fourth to the last, i.e. the second from the first film piece 1*b* and this frame 2*a* is located at the 4th position from the left end in the film piece 1*b.* Similarly, a target frame 2*a* having a serial frame number of '17' is determined to be contained in the second to the last, i.e. fourth from the first film piece 1*d* and located at the 3rd from the left end in this piece 1*d.*

Figure 3:
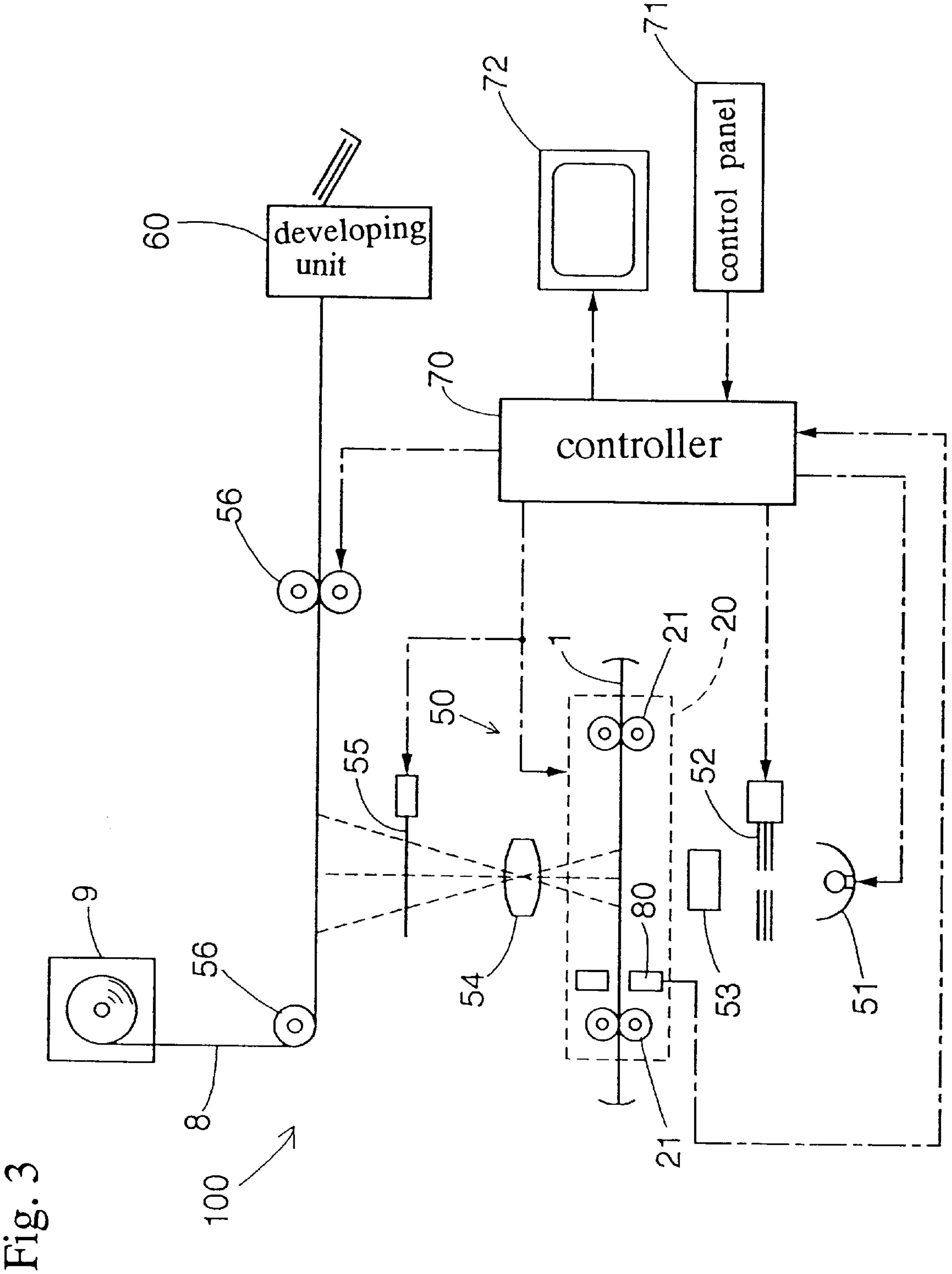
FIG. 3 is a block diagram of a printing system employing a frame position specifying method according to the present invention.

FIG. 3 is a block diagram of a photographic printer 100 for use in the reprint order system according to the present invention. This photographic printer 100 includes an exposing section 100 or exposing an image of each frame 2 of the film piece 1 onto a print paper 8, a developing section 60 for developing the exposed print paper 8, and a controller 70 for controlling the respective sections. The controller 70 is connected with a control panel for allowing inputs of various commands to the printer and a monitor 72 for displaying the image of the frame 2 read by a scanner 80. When the film piece 1 to be printed is conveyed to the exposing section 50 by a film conveyer unit 20 to be detailed later, the image of the target frame 2*a* contained in the film piece 1 is read and this image information is transmitted to the controller 70. Then, based on this image information read from the frame 2, the controller 70 determines exposure conditions and causes the monitor 72 to display a simulated image which will be obtained if the image information is exposed on to the print paper 8 under the determined exposure conditions. The exposing section 50 includes an exposing light source 51, a light modulating filter 52 for adjusting balance of color components of the light irradiated from the light source 51 by projecting or retracting respective filters having yellow, magenta and cyan colors into or from an exposing light path, a mirror tunnel 53 for uniformly mixing the light color components balance-adjusted by the light modulating filter 52, and a printing lens 54 for focusing the image of the frame 2*a* on the print paper 8, a shutter 55, and conveyer rollers 56 for conveying the print paper 8. Based on the exposure conditions determined by the controller 70, the positions of the respective color filters of the light modulating filter 52, the opening period of the shutter 55, i.e. the exposure period are controlled. By observing the display on the monitor 72, if the displayed simulation image is not appropriate, then, an operator of this photographic printer 100 can input to the controller 70 via the control panel 71 an instruction for correcting the exposure conditions, so that the controller 70 determines new corrected exposure conditions according to the correction instruction. Then, based on these finally determined exposure conditions, the operations of the respective components of the exposing section 50 are controlled to expose the image of the target frame 2*a* of the film piece 1 on the print paper 8 withdrawn from a print paper magazine 9.

Figure 4:
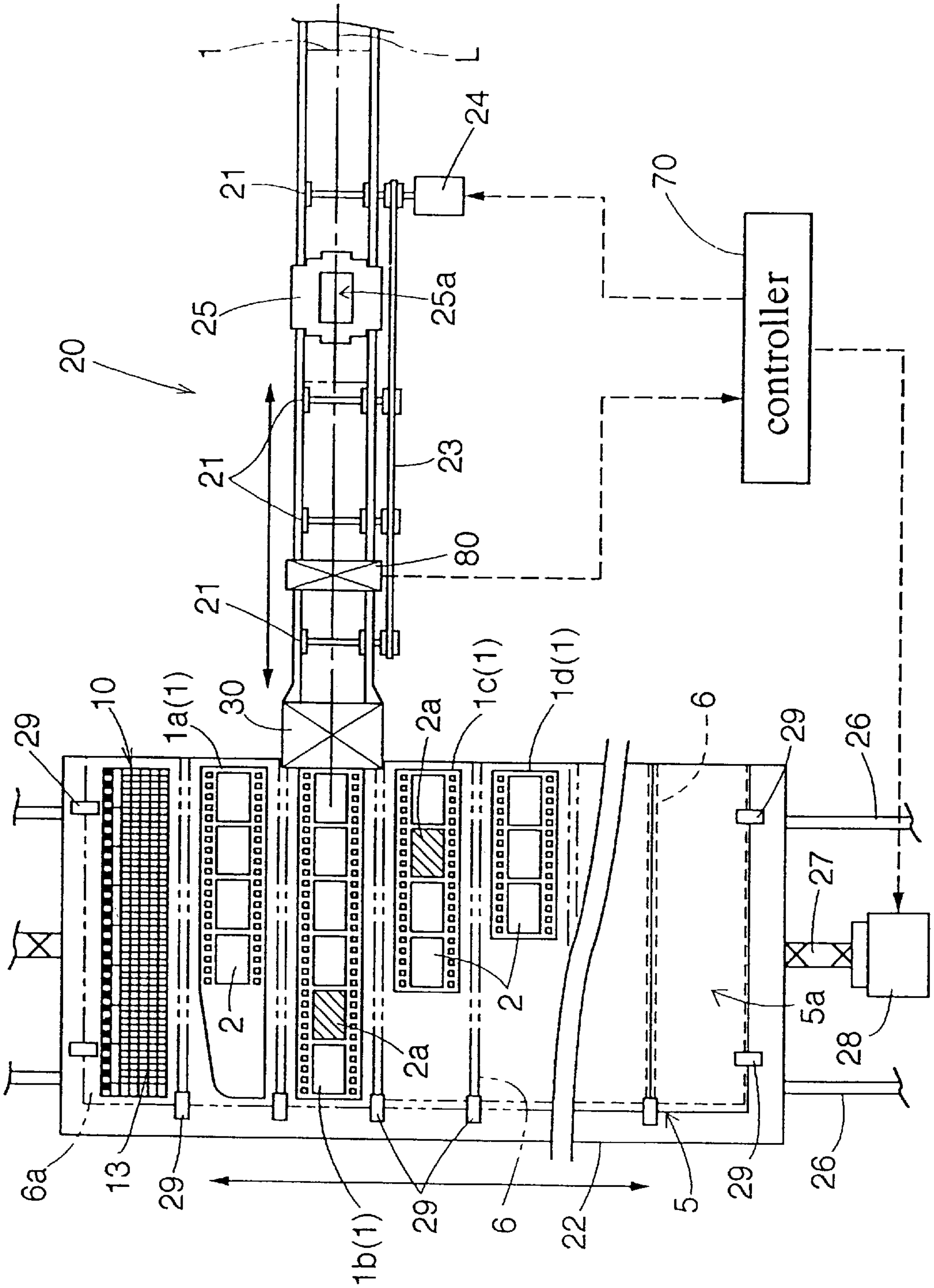
FIG. 4 is a block diagram of a film conveying unit.

Next, with reference to a block diagram of FIG. 4, there will be described the construction of the film conveyer unit 20 for drawing the film piece 1 out of the film piece holder 5, conveying the piece 1 to the exposing section 50 and fixing it in position and then returning the piece 1 after the exposure back into the film holder 5. The film conveyer unit 20 includes a plurality of drive rollers 21 forming a film conveying line L within the exposing section 50 and a film piece carrier 22 for fixedly positioning the film piece holder 5 holding the recording sheet 10 and the film pieces 1 therein relative to the film conveying line L. The drive rollers 21 are driven via a belt 23 by a roller driving motor 24. Incidentally, the film piece 1 is conveyed back and forth as being pinched between the drive roller 21 and an unillustrated pinch roller. On the film conveying line L, there is disposed a film mask 52, which defines an aperture 25*a* for regulating an area on the print paper 8 on which the image of the target frame is to be exposed. The film piece carrier 22 can be moved back and forth in a direction transverse to the film conveying line L by the function of a feeder screw 27 while the carrier 22 is being guided by guide rods 26. The feeder screw 27 is rotated forwardly or reversely by a feeder screw drive motor 28. About a mounting face of the film piece holder carrier 22, there are disposed clamps 29 for fixing the recording sheet 10 or film piece 1 in position. Numeral 30 denotes a transfer device for transferring the recording sheet 10 or the film piece 1 between the drive rollers 21 and the film piece holder carrier 22. This transfer device 30 functions to draw the recording sheet 10 or film piece 1 out of the film piece holder 5 and feeds it to the drive rollers 21 or functions reversely to transfer the sheet or piece from the rollers back into the holder. The construction of this transfer device 30 per se is known, as a device for automatically packing the film piece 1 into the film piece holder 5. Therefore, detailed description of this device will be avoided.

The roller drive motor 24, the feeder screw drive motor 28 and the transfer device 30 are all controlled by the controller 70.

Next, the reprint order processing procedure using the photographic printer having the above-described construction will be described. First, the film piece holder 5 holding the recording sheet 10 and the film pieces 1 is fixedly set at a predetermined position on the film piece holder carrier 22. The recording sheet 10 stores the reprint order information including the position of the target frame 2*a* to be reprinted and the number of reprints to be obtained and reference frame position information including the serial frame numbers of the first and second reference frames R1, R2 according to the mark sheet recording method. Then, the carrier 22 is moved so as to bring the recording sheet 10 in registry with the film conveying line L for allowing reading of the reprint order information and the reference frame position information in the sheet 10. Namely, the transfer device 30 then draws the recording sheet 10 from the film piece carrier 22 and transfers this sheet 10 to the drive rollers 21, by which the sheet 10 is conveyed along the film conveying line L to the right side in FIG. 4. When the rear end of the recording sheet 10 passes a scanner 80, the drive rollers 21 are reversely rotated to convey the sheet 10 back toward the film piece holder 5 (to the left side in FIG. 4). And, in the course of reverse conveying process, the scanner 80 scans the frame number area 11 and the print number area 12 and the reference frame number area 13 (all of these areas record the data according to the mark sheet method) and then transmits to the controller 70 the data concerning the serial frame number of the frame 2*a* to be reprinted, the number of reprints to be obtained and the serial frame numbers of the first and second reference frames R1, R2. The film conveying line L formed by the drive rollers 21 disposed in series includes side guides in the form of grooves. Therefore, once the recording sheet 10 enters this film conveying line L, the recording sheet 10 is accurately guided sidewise to be suitable for reliable data reading operation by the scanner.

The controller 70 stores also a program for determining the film pieces 11*b*, and 1*d* containing the target frames 2*a* to be printed and the positions of these frames in the respective film pieces based on the data scanned from the recording sheet 10.

Accordingly, first, the film holder carrier 22 is moved to bring the second film piece 1*b* into registry with the film conveying line L, and the film piece is drawn out of the film holder 5 by the transfer device 30 and then conveyed further by the drive rollers 21. In the course of this conveying operation, the scanner 80 scans the frames 2. Using these scanned frame data, the controller 70 controls the drive motor 24 to bring the frame 2*a* located at the fourth position from the left end of the film piece to the position of the aperture 25*a* of the film mask 25, i.e. the exposing position. When the target frame 2*a* is set at the exposing position, the exposing section 50 exposes the image of this target frame 2*a* on to the print paper 8. After this exposure, the film piece 1*b* is returned into the same pocket 6 of the film holder 5.

Similarly, the fourth film piece 1*d* is drawn out of the film holder 5 and the image of the other target frame 2*a* located at the third position from the left end is exposed on to the print paper 8. In this case, the same image is exposed on the print paper 8 for seven times, to produce seven prints of this image.

In the foregoing description, the position of the target frame 2*a* within the film piece 1 too is determined by using the serial frame numbers of the first and second reference frames. Instead, this may be determined by causing the serial frame number of the frame to be directly read by the scanner. The most basic concept of the invention is to specify a film piece containing a target frame to be printed by using the serial frame numbers of the first and second reference frames.

Modified Embodiments

In the foregoing embodiment, the frames located at the opposed ends of the second to last film piece 1*d* are used as the first and second reference frames. In specifying the film piece containing a target frame and the order of this frame within the particular film piece by using the serial frame numbers of the first and second reference frames, it is important that the first and second reference frames be designated so as to allow the determination of the total number of the frames of the second to last film piece. As long as this condition is met, any other frames may be designated as the first and second reference frames. In this, the positions of the designated reference frames should be understood by the customer and the camera shop attendant, and also the specific mathematical expressions for specifying the film piece to be printed and the position of the target frame within the film piece may be modified conveniently in accordance with the designated reference frame positions.

Further, the method of recording the reprint order information in the recording sheet 10 is not limited to the mark sheet type described hereinbefore. Instead, any other method such as the magnetic card method, bar code method, or punched card method may be employed. Further, in the foregoing embodiment, for reading the data from the recording sheet, the scanner originally equipped to the photographic printer system is employed. Instead, another scanner dedicated for the data reading purpose may be provided separately.

What is claimed is:

1. A system for specifying a position of a target frame to be printed in a plurality of film pieces obtained by cutting a film containing a plurality of frames between forward and rear ends thereof in such a manner that the first film piece and the last two film pieces each has fewer frames than a predetermined number while the other film pieces have the pre determined number of frames, which comprises:

film piece holder means for holding the film pieces according to a predetermined order;

input means for inputting a serial frame number of a right end frame in the second to last film piece as a serial frame number of a first reference frame, and a serial frame number of a left end frame in the second to last film piece as a serial frame number of a second reference frame;

a controller for specifying one film piece containing the target frame based on the serial frame numbers of the first and second reference frames inputted by the input means; and a film conveyor unit for drawing the specified film piece out of the film piece holder means and transferring this film piece along a film conveying line to an exposing unit.

2. A system according to claim 1, wherein said controller determines also the position of the target frame within the specified film piece.

3. A system according to claim 1, wherein said input means comprises a reader device provided on the film conveying line for reading the serial frame numbers of the first and second reference frames directly from the second to last film piece drawn out of the film piece holder means by the film conveyor unit.

4. The system according to claim 1, wherein the serial frame numbers of the first and second reference frames and of the target frame are recorded in a recording sheet which may be stored in the film piece holder means, and wherein said input means comprises a reader device provided on the film conveying line for reading the serial frame numbers of the first and second reference frames from the recording sheet drawn out of the film piece holder means by the film conveyor unit.

5. The system according to claim 1, wherein if the predetermined number of the frame is six, said controller specifies said one film piece containing the target frame having a serial frame number 'N' according to the following algorithm:

(i) IF Y is less than or equal to N and N is less than or equal to X, THEN said one film piece is the second to last film piece;

(ii) IF Y is greater than N, THEN said one film piece is the (QUOT {Y−1N, 6}+3)th film piece as counted from the last film piece; and (iii) IF N is greater than X, THEN said one film piece is the last film piece;

wherein

'X' is the serial frame number of the first reference frame,

'Y' is the serial frame number of the second reference frame, and

'QUOT (Numeral 1, Numeral 2)' is an integer portion of a quotient obtained by dividing Numeral 1 by Numeral 2.

6. The system according to claim 5, wherein if the predetermined number of the frame is six (6), said controller specifies the position of the target frame having the serial frame number 'N' in the specified film piece according to the following algorithm:

(i) IF the specified film piece is the second to last film piece, then the (N−Y+1)th frame from the left end of this film piece is the target frame;

(ii) IF the specified film piece is the first film piece, THEN the (MOD {Y−1−N, 6}+1)th frame from the right end of this film piece is the target frame;

(iii) IF the specified film piece is the last film piece, THEN the (N−X)th frame from the left end of this film piece is the target frame; and (iv) IF the specified film piece is other than the above, THEN (6−MOD {Y−1−N, 6})th frame from the left end of this film piece is the target frame;

wherein

'X' is the serial frame number of the first reference frame,

'Y' is the serial frame number of the second reference frame, and

'MOD (Numeral 1, Numeral 2)' is a remainder of a quotient obtained by dividing Numeral 1 by Numeral 2.

7. A method of specifying a position of a target frame to be printed in a plurality of film pieces as held in piece film holder means, the film pieces being obtained by cutting a film containing a plurality of frames between forward and rear ends thereof in such a manner that the first film piece and the last two film pieces each has fewer frames than a predetermined number while the other film pieces has the predetermined number of frames, which comprises the steps of:

setting a serial frame number of a right end frame in the second to last film piece to a serial frame number of a first reference frame and a serial frame number of a left end frame in the second to last film piece to a serial frame number of a second reference frame;

specifying, based on the set serial frame numbers of the first and second reference frames, one film piece containing the target frame; and drawing the specified film piece out of the film piece holder means and transferring this film piece along a film conveying line to an exposing unit.

8. A method according to claim 7, further comprising the step of determining the position of the target frame within the specified film piece.

9. A method according to claim 7, wherein in the inputting step, the serial frame numbers of the first and second reference frames are read by a reader device directly from the film piece drawn out of the film piece holder means.

10. A method according to claim 7, wherein the serial frame numbers of the first and second reference frames and of the target frame are recorded in a recording sheet which may be stored in the film piece holder means;

and wherein the serial frame numbers of the first and second reference frames are read by a reader device from the recording sheet drawn out of the film piece holder means.

11. The method according to claim 7, wherein if the predetermined number of the frame is six (6), said one film piece containing the target frame having a serial frame number 'N' is specified according to the following algorithm:

(i) IF Y is smaller than or equal to N and N is smaller than or equal to X, THEN said one film piece is the second to last film piece;

(ii) IF Y is greater than N, THEN said one film piece is the (QUOT {Y−1−N, 6}+3)th film piece as counted from the last film piece; and (iii) IF N is greater than X, THEN said one film piece is the last film piece;

wherein

'X' is the serial frame number of the first reference frame,

'Y' is the serial frame number of the second reference frame, and

'QUOT (Numeral 1, Numeral 2)' is an integer portion of a quotient obtained by dividing Numeral 1 by Numeral 2.

12. The method according to claim 11, wherein if the predetermined number of the frame is six (6), the position of the target frame having the serial frame number 'N' in the specified film piece is specified according to the following algorithm:

(i) IF the specified film piece is the second to last film piece, THEN the (N−Y+1)th frame from the left end of this film piece is the target frame;

(ii) IF the specified film piece is the first film piece, THEN the (MOD {Y−1−N, 6}+1)th frame from the right end of this film piece is the target frame;

(iii) IF the specified film piece is the last film piece, THEN the (N−X)th frame from the left end of this film piece is the target frame; and (iv) IF the specified film piece is other than the above, THEN (6−MOD {Y−1−N, 6})th frame from the left end of this film piece is the target frame;

wherein

'X' is the serial frame number of the first reference frame,

'Y' is the serial frame number of the second reference frame, and

'MOD'(Numeral 1, Numeral 2)' is a remainder of a quotient obtained by dividing Numeral 1 by Numeral 2.

* * * * *